United States Patent [19]
Hawkins et al.

[11] 4,444,286
[45] Apr. 24, 1984

[54] TORQUE-CONTROL WITH OVERSPEED REGULATION AND METHOD OF CONTROLLING A HYDROSTATIC DRIVE

[75] Inventors: Royal R. Hawkins, Burlington; Leland E. Kuntz, Edina, both of Minn.

[73] Assignee: Sundstrand Corporation, Rockford, Ill.

[21] Appl. No.: 377,872

[22] Filed: May 13, 1982

[51] Int. Cl.³ .............................................. B60K 17/34
[52] U.S. Cl. .................................... 180/197; 60/451; 180/243
[58] Field of Search ....................... 180/243, 242, 197; 60/448, 449, 451

[56] References Cited

U.S. PATENT DOCUMENTS 2,516,662  7/1950  Vickers et al. .................. 60/448 X
3,057,427  10/1962  Glasgow ............................ 180/243
4,186,816  2/1980  Pfundstein ......................... 180/243

Primary Examiner—John A. Pekar
Attorney, Agent, or Firm—Ted E. Killingsworth; Michael B. McMurry; Harold A. Williamson

[57] ABSTRACT

The present invention is directed to a torque control with overspeed regulation and a method of controlling a hydrostatic drive for use in an auxiliary wheel drive of a vehicle which has both primary driven wheels and auxiliary driven wheels. The torque control permits maximum torque drive of the auxiliary wheels when the primary driven wheels slip but yet prevents overspeed operation of the auxiliary wheels. Preferably the torque control with overspeed regulation has both an aggressive control and a sensitivity control so that the auxiliary wheel drive can be selectively modulated with respect to the primary wheel drive.

16 Claims, 3 Drawing Figures

TORQUE-CONTROL WITH OVERSPEED REGULATION AND METHOD OF CONTROLLING A HYDROSTATIC DRIVE

The present invention is directed to a hydrostatic transmission auxiliary wheel drive and more particularly to a torque control system which modulates the torque produced by the hydrostatic drive up to a "maximum torque allowed" setting. This is overriden by a speed ratio control whose output is dependent upon the speed of the hydrostatically driven wheels relative to the speed of the primary driven wheels.

BACKGROUND OF THE INVENTION

Motor grader drive systems have been marketed wherein speed sensors are utilized to monitor and control the speed ratio between the speed of the hydrostatically driven front wheels relative to rear wheel speeds wherein the front wheels are driven by a hydrostatic motor in closed loop connection with a variable displacement hydrostatic pump and wherein pump displacement is varied in response to the speed ratio to modulate the speed of the front wheel drive. In the primary operational mode, an electronic control is utilized to modulate the hydrostatic drive so that the front wheel drive train is driven at a speed slightly less than rear wheel speed. With little or no slippage of the rear wheels, an overrunning clutch permits the front wheels to turn at ground speed. However, if the rear wheel slippage is greater than the speed difference between the front drive train and the rear wheels, the overrunning clutches engage to turn the front wheels at the slower speed. Therefore front wheel slippage is always slightly less than rear wheel slippage when the unit is operating in the primary operational mode.

This system has a second mode of operation referred to as an "aggressive" mode wherein the electronic control is utilized to drive the front wheels at a slightly greater speed than the rear wheels. This aggressive mode of operation is used primarily to improve steering control when the grader is in lower speed drive ranges. Overrunning capability of the hydrostatic motors is used to reduce torque interferences between the front wheel drive and the main transmission drive. In this system the aggressive control should not be used where tractive conditions are good such as on dry hard surfaces since it will result in loss of performance and efficiency.

SUMMARY OF THE INVENTION

The present invention is directed to a torque control system which is utilized in conjunction with the speed ratio control system to modulate an auxiliary hydrostatic drive to an auxiliary driven wheel of a vehicle relative to the drive of a main driven wheel of a vehicle. The torque controlled hydrostatic drive with overspeed regulation is easy to set up and adaptive to current load conditions, and normal load sharing between the auxiliary wheel drive and the main wheel drive is easily modulated by the operator.

It is an object of the present invention to provide a control for hydrostatic auxiliary driven wheels wherein the drive to the auxiliary wheels is at maximum selected torque whenever the auxiliary driven wheels are rotating at a substantially slower speed than the primary driven wheels. Conversely, the hydrostatic drive to the auxiliary wheels is reduced to low torque values whenever the auxiliary driven wheels are rotating substantially faster than the primary driven wheels. This type of torque control of the hydrostatic drive, in conjunction with speed ratio control, permits maximum drive of the auxiliary wheels whenever the primary wheels have lost traction to the degree that induces substantial spinning but prevents high speed spinning of the auxiliary wheels when they lose traction. This also provides the desirable advantage that approximately 50% of the maximum selected torque is delivered to the auxiliary drive wheels when good traction is provided.

It is a further object of the present invention to provide a combined torque control and speed ratio control for an auxiliary hydrostatic drive system which includes an operator set aggressive control which determines the speed ratio between the auxiliary driven wheel and the primary driven wheel at which no further drive to the auxiliary driven wheel is provided.

It is a further object of the present invention to provide a torque control and speed ratio control for an auxiliary hydrostatic drive which includes sensitivity selection to determine the range of speed over which the auxiliary drive is reduced from maximum selected torque setting to zero torque.

It is another object of the present invention to provide a selected maximum allowable torque control with a speed ratio control for an auxiliary hydrostatic drive which permits hydrostatic operation over the full operational range of the hydrostatic transmission.

Another object of the present invention is to provide an auxiliary hydrostatic drive for a vehicle which is inactive until the primary drive of the vehicle has moved the vehicle to a certain minimal or nominal speed. It is a further object of the present invention to provide a torque control with speed ratio control for an auxiliary wheel drive which will operate in the reverse direction of travel.

It is another object of the present invention to provide a throttle switch with a torque controlled auxiliary hydrostatic drive so that the torque of the auxiliary drive drops to minimum when the throttle is at idle position.

It is also an object of the present invention to provide a torque control hydrostatic drive with overspeed regulation for a vehicle having a first driven wheel and a second wheel driven independently of the first driven wheel, the drive train for such second wheel including a vehicle prime mover and a hydrostatic transmission comprising a variable displacement pump driven by the prime mover, a motor drivingly connected to the second wheel, and a hydrostatic line interconnecting the pump and the motor in a manner that the motor is driven by the pump, the torque control characterized by; torque sensing means responsive to the torque transmitted by the hydrostatic transmission to provide a torque signal, torque responsive means having an output operatively connected to the pump for modulating the displacement of the pump in response to the torque signal, speed ratio sensing means comprising a first speed sensor responsive to the RPM of the first wheel to provide a first speed signal, a second speed sensor responsive to the RPM of the second wheel to provide a second speed signal, comparator means for comparing the first and second speed signals to generate a speed ratio signal proportional to the ratio of RPM's of the first and second wheels, and transducer means receiving the speed ratio signal and connected to the torque responsive means to modify the torque responsive means output in response to the speed ratio signal.

A still further object of the present invention is to provide a method of controlling the auxiliary hydrostatic drive to a vehicle having primary driven wheels and auxiliary hydrostatically driven wheels comprising: sensing the pressure differential in the hydrostatic transmission to provide a torque signal proportional to the torque transmitted by the hydrostatic transmission and applying the torque signal to means controlling the displacement of a variable displacement pump in the hydrostatic transmission, generating a speed ratio voltage signal proportional to the speed differential between the auxiliary driven wheels and the primary driven wheels wherein the speed ratio signal is maximum when the auxiliary-to-primary speed ratio is less than 1 and the speed ratio signal decreases to zero at a selected auxiliary-to-primary speed ratio greater than 1, and converting the speed ratio signal into a hydrostatic signal which modulates the displacement of the variable displacement pump in addition to the displacement previously selected by the torque sensing signal.

DESCRIPTION OF THE PREFERRED EMBODIMENT

Figure 1:
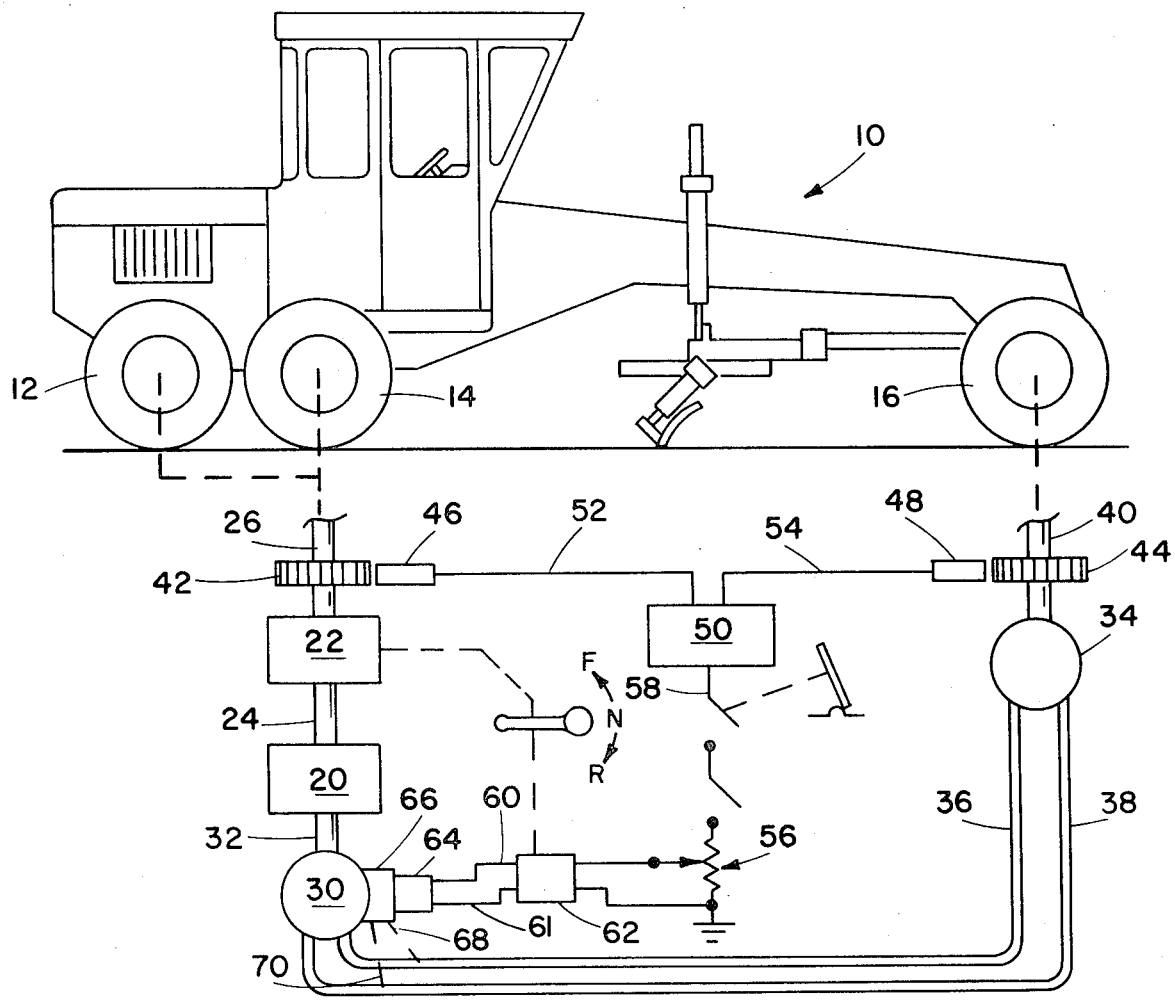
FIG. 1 is a schematic diagram teaching the torque control hydrostatic drive with overspeed regulation of the present invention as applied to a road grader.

Reference is now made to FIG. 1 wherein the torque controlled hydrostatic drive with overspeed regulation of the present invention is depicted as it would be applied to a typical road grader 10 having dual axle rear wheels 12 and 14 and front wheels 16 (each wheel representing a pair of wheels, one on each side of the vehicle). The grader rear wheels are driven by a primary drive comprising a primer mover such as diesel engine 20 driving a rear transmission 22 by means of a shaft 24. The rear transmission 22 has output shaft 26 which is schematically shown by dotted lines as connected to either, but preferrably both, of the rear wheels 12 and 14 so as to provide the primary vehicle drive. Rear transmission 22 need not be of any particular form and may be a mechanical transmission, a hydrostatic transmission, a hydromechanical transmission, or a hydrodynamic transmission.

The road grader 10 is also provided with an auxiliary hydrostatic drive which consists of a variable displacement pump 30 also driven by engine 20 through shaft 32. A hydrostatic motor 34, of either the fixed or variable displacement type, is connected with the pump 30 by hydrostatic lines 36 and 38 so as to form a closed loop hydrostatic circuit. Motor 34 is provided with an output shaft 40 which is shown connected (by dotted line) to front wheels 16 so that the auxiliary hydrostatic drive may be provided to such front wheels.

Both the rear wheel drive shaft 26 and the front wheel drive shaft 40 are provided with electronic speed sensing units typically consisting of spur gears 42 and 44 and pulse pick-up units 46 and 48. The front and rear drive shaft speed sensing units provide variable frequency signals which are proportional to the rational speed of the two drive shafts 26 and 40 to the electric speed ratio control 50 via electric lines 52 and 54. Control 50 will be described later in greater detail in conjunction with FIG. 2.

The speed ratio control 50 generates an output voltage referred to as a speed ratio signal which is provided to a "maximum torque setting" control 56 via line 58. The maximum torque setting control 56 acts as a voltage divider and provides a voltage signal through lines 60 and 61 and F-N-R (forward/neutral/reverse) switch 62 to an electro-hydraulic transducer 64. The output of transducer 64 is then applied to a torque responsive servo control 66 to modify its normal torque sensing control function to vary the displacement of pump 30. The electro-hydraulic control 64 and the torque responsive servo control 66 are commercially available and both shown in greater detail in FIG. 2. In order to provide a torque signal responsive to the hydrostatic transmission torque output, the servo control 66 is connected by fluid pressure lines represented by dotted lines 68 and 70 to the transmission main loop hydrostatic lines 36 and 38 to sense the pressure differential in the main loop and thus the torque output of the hydrostatic transmission.

Figure 2:
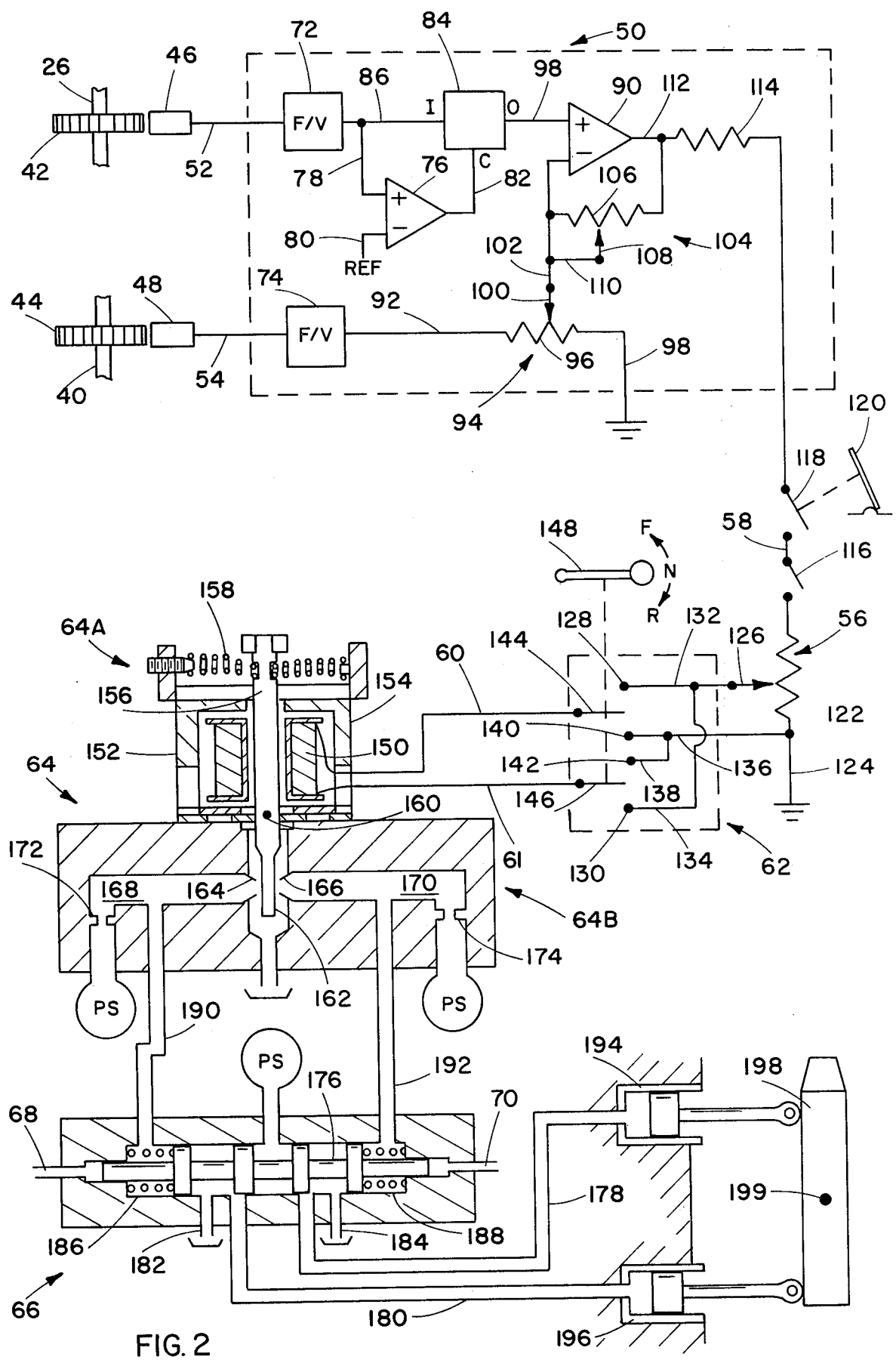
FIG. 2 is a schematic diagram (with some parts in cross-section) showing the electro-hydraulic control circuit of the present invention.

Referring now to FIG. 2, the electric speed ratio control 50, the electro-hydraulic control 64, and the torque responsive servo control 66 are shown in greater detail. The speed responsive variable frequency signals from pulse pick-up units 46 and 48 are supplied to frequency-to-voltage converters 72 and 74 respectively which provide voltage signals proportional to wheel RPM. The voltage signal representing rear drive shaft speed is then supplied to a comparator 76 via line 78 where it is compared with a reference voltage "Ref." supplied by line 80. The reference voltage Ref. represents a minimal or nominal speed, such as 0.5 mile per hour, which is compared with the voltage representing the rear drive shaft 26 speed. If the rear wheels have not obtained this minimal or nominal speed, there is no output from comparator 76. The output of comparator 76 is supplied by line 82 to a solid state switch 84 which is also supplied by the rear wheel speed voltage signal by line 86. Switch 84 acts as a low speed lockout and only conducts the rear wheel speed signal of line 86 when comparator 76 indicates that the rear wheels have reached nominal speed. The rear wheel speed signal is then supplied by line 88 to the positive terminal of comparator 90.

The frequency-to-voltage converter 74 voltage output represents front wheel or auxiliary drive speed and is supplied by a line 92 to an aggressive control 94 which selects the maximum speed ratio permitted between front and rear wheels and whose operation will be described in detail later. The aggressive control consists of a potentiometer with a resistor 96 connected to ground by line 98 and a wiper 100. The aggressive control 94 acts as a voltage divider whose output is connected to the negative terminal of comparator 90 by line 102. The comparator 90 is utilized to provide a voltage output signal proportional to the ratio between the rear wheel speed signal when conducted by switch 84 and the front wheel speed signal as modified by the aggressive control 94.

In parallel with the comparator 90 is a sensitivity control 104 which consists of a potentiometer comprising resistor 106 and wiper 108 connected to line 102 by line 110. The sensitivity control 104 controls the rate of change of the torque control signal as will be described later in greater detail relative to the graph of FIG. 3.

The proportional output of comparator 90 then passes through line 112 and dropping resistor 114, if necessary, to the maximum torque setting control 56. This output from control 50 is referred to as the speed ratio signal will typically vary from 0 volts to 10 volts dependent upon the speed ratio of front to rear wheel speeds as sensed by comparator 90. The speed ratio signal will reach its maximum value when the rear wheels, due to slippage, are driven at a significantly higher speed than the front wheels. This increases the torque transmitted to the front wheels by the auxiliary hydrostatic drive. When slippage is incurred by the front wheels to the point that the front wheels are rotating at a significantly higher speed than the rear wheels, the output from the control circuit will be reduced to zero volts (at that speed ratio selected by the aggressive control 94) to prevent further drive of the front wheels.

Optionally the line 58 connecting the output of the speed ratio control 50 with the maximum torque setting control 56 may be provided with two switches 116 and 118. The switch 116 is a manually controlled ON/OFF switch whereby the vehicle operator may selectively disconnect the auxiliary hydrostatic front wheel drive as may be desired for a high speed or travel range of operation of the vehicle. The switch 118 is a throttle control switch which is connected to throttle 120 in a manner that when the throttle 120 is in an idle position, switch 118 is open to disconnect the speed ratio control from the system. This prevents any auxiliary front wheel drive when the engine 20 is at idle.

The maximum torque setting control 56 comprises a potentiometer consisting of a resistor 122 connected to ground by line 124 and a wiper 126. The maximum torque setting control 56 acts as a voltage divider and is set by the vehicle operator to modify the speed ratio signal in a manner that limits the maximum voltage that can be sent to the electro-hydraulic transducer 64. The torque setting control wiper 126 is connected to terminals 128 and 130 of a double pole-double throw F-N-R switch 62 by lines 132 and 134 respectively. Lines 136 and 138 connect terminals 140 and 142 of the F-N-R switch to ground line 124. Double poles 144 and 146 of the switch 62 are operatively connected to the F-N-R handle 148. The poles 144 and 146 are also electrically connected by lines 60 and 61 to the coil 150 of the electro-hydraulic transducer 64. When the handle 148 is in the neutral position, there is no electrical connection across switch 62 so that there is no voltage across the coil 150. When the handle 148 is in the forward or reverse positions, the poles 144 and 146 contact either the upper or lower terminals so as to impress the voltage output of the maximum torque setting control 56 across the coil 150 in opposite directions. It is noted that the handle 148 not only reverses the voltage impressed across the coil 150, but also reverses the operation of the rear wheel transmission 22.

The electro-hydraulic transducer 64 includes an electric force motor 64A and a nozzle/flapper pilot valve 64B. The electric force motor 64A consists of two magnetic poles 152 and 154 and an armature 156 biased to a center or null position by adjustable spring 158. The direction and amount of the voltage impressed across coil 150 surrounding armature 156 will determine the direction and amount of pivotal movement of armature 156 about pivot 160. The lower end of armature 156 forms a flapper 162 for the pilot valve 64B. The pilot valve 64B also includes two nozzles 164 and 166 both supplied with a pressurized control fluid from a common pressure source represented by PS. The position of flapper 162 relative to nozzles 164 and 166 will modulate flow through the nozzles to establish a pressure differential in pilot valve chambers 168 and 170 defined by nozzles 164 and 166 and their respectively associated restricted orifices 172 and 174.

The torque responsive servo control 66 is quite standard and consists of a spring centered valve spool 176 whose axial position is determined by a pressure differential acting on each end of the spool 176. This pressure differential is provided by the lines 68 and 70 connecting the torque responsive servo control 66 with hydrostatic lines 36 and 38 of the closed loop of the hydrostatic transmission as seen in FIG. 1. The pressure differential across the closed loop represents the torque output of the transmission which is used to modulate the axial position of the valve spool. The torque responsive servo control 66 is also provided with control fluid from the common pressure source PS. The axial position of the valve spool 176 modulates the flow of control fluid from the pressure source to servo lines 178 and 180. Whichever line 178 or 180 that is not in communication with the pressure source PS is in communication with one of two drain lines 182 and 184.

The axial position of the valve spool 176 is further modulated by the differential pressure output of pilot valve 64B. Pilot valve chambers 168 and 170 are connected to chambers 186 and 188 of the torque responsive servo valve 66 by lines 190 and 192. Since the pressure differential across the transmission closed loop is substantially greater than the pressure differential signal generated by the electro-hydraulic transducer 64, the pressures in chambers 186 and 188 act on larger areas of the valve spool 176 than the pressures from lines 68 and 70. The pressure differential established in the chambers 186 and 188 will further modulate the position of the valve spool 176 to also control the amount of control fluid which is directed to servo lines 178 and 180. The servo lines 178 and 180 are connected to servo cylinders 194 and 196 to modulate the angular position of the variable displacement pump swash plate 198 about pivot 199.

OPERATION

Figure 3:
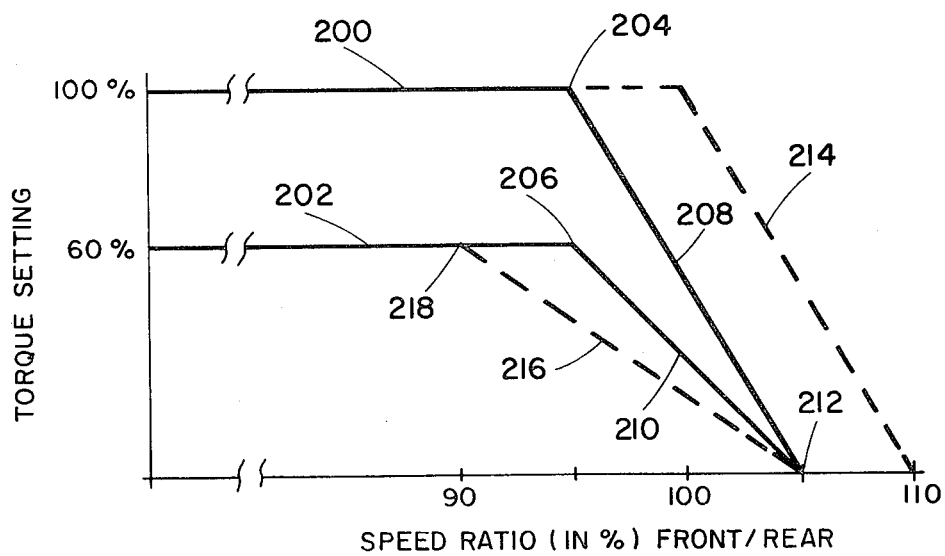
FIG. 3 is a graph representing torque output of the auxiliary hydrostatic drive of the present invention relative to the speed ratio between front and rear wheels.

The operation of the torque control hydrostatic drive with overspeed regulation can best be understood when viewing the system output as represented by the graph of FIG. 3 while reviewing the various control elements of the schematic of FIG. 2. The ordinate of the graph of FIG. 3 represents the amount of torque supplied to the auxiliary hydrostatic front wheel drive of the grader when utilizing the control system of the present invention. The abscissa of the graph represents the speed ratio of the front wheels to the rear wheels as measured by the pulse pick-up units 48 and 46 of the front drive shaft and rear drive shaft tachometers and before modification by the various elements of the control system.

As explained above, the output of the speed ratio control 50 will reach maximum value (for example, 10 volts) when the rear wheels are rotating substantially faster than the front wheels such as caused by rear wheel slippage or upon the start of auxiliary drive. During operation under this condition, the voltage output of the electric control system will be solely determined by the maximum torque setting control 56 which is a voltage divider. When the potentiometer wiper 126 is in its upper position, this voltage divider will have its maximum output to provide a maximum 100% torque setting as represented by the horizontal line 200 in the graph of FIG. 3. This maximum torque setting can be manually selected by the operator to provide the desired auxiliary hydrostatic front wheel drive in accordance with the conditions of vehicle operation. By manually moving the wiper 126 across the potentiometer, other maximum selected torque settings can be obtained with a 60% maximum torque setting also being illustrated in the graph of FIG. 3 by line 202. As long as minimum speed (for example 0.5 mile per hour) has been obtained by the primary drive of the rear wheels, thus providing an output from comparator 76 as explained above, and the rear wheels 12 and 14 are rotating substantially faster than the front wheels 16, the voltage output to the electro-hydraulic transducer will be that maximum selected by the maximum torque setting control 56. This maximum voltage of 10 volts (6 volts if maximum at 60%) will cause the electro-hydraulic transducer 64 to generate a pressure differential between chambers 186 and 188 of the torque responsive servo control 66. This in turn strokes the swash plate 198 as modulated by the torque feedback in torque signal lines 68 and 70. It is noted that the auxiliary drive during excessive rear wheel slipping is limited by the maximum torque capabilities of the transmission (or the setting of maximum torque allowable control 56 if lower than transmission capability) and is not set by a given speed ratio setting.

As rear wheel slippage is reduced and thus the speed ratio between the front and rear wheels is increased so as to approach unity, or 100%, the voltage output of speed ratio circuit 50 will be gradually reduced. In the two solid line examples illustrated in the graph of FIG. 3, such reduction begins to occur at 95% speed ratio represented by points 204 and 206 of the graph. The droppage in voltage output of speed ratio control 50 to the maximum torque setting control 56 drops from maximum output to a minimum output of zero volts and thus provides a torque setting output as represented by graph lines 208 and 210 dependent upon whether the maximum torque setting control 56 is set at 100% or 60%.

By adjusting the settings of the sensitivity control 104 and the aggressive control 94 of the electric control 50, the slope and position of the control output may be modified. The aggressive control 94 is used by the vehicle operator to modify the point on the speed ratio abscissa where the torque setting output reaches zero. Increasing the resistance of the potentiometer 96 by moving the wiper 100 toward the right decreases the voltage input to the negative terminal of the comparator 90. Because a lesser proportion of the front wheel speed signal is compared with 100% of the rear wheel speed signal at comparator 90, the speed ratio at which output voltage drops is increased, thus shifting the zero output point to a higher speed ratio. For the solid line example illustrated by line 208 in the graph, this zero torque output point 212 occurs at a speed ratio of 105%. By increasing the aggressive control 94 setting the relative speed ratio as sensed by the comparator 90 is increased to shift the zero torque output point to 110%. The new output curve is represented by dotted line 214. Since the aggressive control 94 is a potentiometer, the operative speed ratio range may be shifted either direction, but it is desirable to always maintain the zero torque output point above a 100% or unity speed ratio.

The slope of line 208 and 210 is controlled by the position of the wiper 108 relative to the resistance 106 of the potentiometer of the sensitivity control 104. The sensitivity control 104 setting, normally set at the factory, controls the speed ratio range over which the output of control 50 drops from maximum to zero. For both lines 208 and 210, this occurs over a 10% speed ratio range, i.e. from 95% setting for maximum output to 105% setting for from minimum output. It is noted that in the example illustrated by lines 208 and 210 that this 10% range is centered about the 100% speed ratio. Thus when the speed ratio between the front wheels and the rear wheels is unity or 100%, the output as represented by the lines 208 and 210 is 50% of the maximum torque setting as determined by the maximum torque setting control 56. By changing the setting of the sensitivity control 104, and taking the 60% maximum torque example, the range of torque output drop is changed as represented by the dotted line 216. It is noted that if the aggressive control 94 has not been modified, the zero output point 212 is still at the 105% speed ratio. However, since the slope is now more gradual, the drop in torque output starts to drop at point 218 which is at the 90% speed ratio. The torque output drop occurs over a 15% range rather than a 10% range. Thus 50% of the maximum torque output selected by control 56 now occurs at 97.5% rather than 100%. While this illustrated example is for a maximum torque setting of 60%, the same would be true for any maximum torque settng as selected by the maximum torque setting control 56.

By modulating both the sensitivity control 104 which is normally factory set and the aggressive control 94 which is set by the vehicle operator, any particular operation curve can be obtained. The height of any given operating curve is obtained by the manual vehicle operator setting of the maximum torque setting control 56 as explained above.

Also as pointed out above, when describing the structure of the control circuit, there are various other functions which modify the operation of the control. The comparator 76 and the solid state switch 84 are utilized to provide a low speed lockout which prevents operation of the auxiliary front wheel drive until a certain minimum speed is obtained by the primary drive to the rear wheels. Furthermore due to switch 118 operated by the throttle 120, torque is not provided to the front wheels when the throttle 120, and thus the engine or prime mover, is at idle. There is also operator manual selection of the auxiliary drive function through manually operated switch 116. Normally such manual selection to eliminate the auxiliary drive is utilized when the vehicle is put into the transport mode or high speed mode of operation. It is furthermore noted that due to the F-N-R switch 62 that the voltage output from the maximum torque selected control 56 may be reversed so that the current through the coil 150 of the electric force motor 64A is reversed for the utilization of the auxiliary hydrostatic drive in reverse operation of the vehicle.

It is thus seen by the above detailed description of both the structure of the preferred embodiment and the operation thereof, that a primary torque control of a hydrostatic auxiliary drive is provided wherein torque is controlled by the maximum torque setting control 56 and wherein such maximum torque is further controlled by a speed ratio control system which prevents overspeed operation of the auxiliary drive. The control curves of the overspeed regulation may be further modified by either the aggressive control 94 and the sensitivity control 104 to provide the desired operation of the vehicle. Since the primary control of the hydrostatic transmission operation is modulated by torque sensing, slippage of the auxiliary driven wheels will reduce the pressure differential across the main closed loop of the transmission and thus reduce the pressure differential applied across the valve spool 176 as applied by fluid pressure lines 68 and 70. This decrease in pressure differential would normally increase the pump swash plate angle. However, the increasing speed ratio of the front wheels relative to the rear wheels would reduce the voltage to coil 150 and equilibrium would be reached and some low torque produced at 104% speed ratio (slightly less than the 105% speed ratio where torque reaches zero in the solid line example given in the graph of FIG. 3). It is this overspeed regulation of the primary torque control of the auxiliary drive that greatly reduces the slippage of the auxiliary driven wheels.

It is thus seen that the primary objects of the invention are fully met by the above described structure to provide a torque control with overspeed regulation for an auxiliary drive. It is further understood that various modifications could be made to the preferred embodiment described in detail above, and that such modifications would fall within the spirit of the invention as claimed below.

We claim:

1. A torque control with overspeed regulation for the hydrostatic drive of a vehicle having at least one first driven wheel and at least one second wheel driven independently of said first driven wheel, the drive train for said second wheel including a vehicle prime mover and a hydrostatic transmission comprising a variable displacement pump driven by said prime mover, a motor drivingly connected to said second wheel, and a hydrostatic line interconnecting said pump and said motor in a manner that said motor is driven by said pump, said torque control characterized by;
   torque sensing means responsive to the torque transmitted by said hydrostatic transmission to provide a torque signal, torque responsive means responsive to said torque signal and having an output operatively connected to said variable displacement pump for modulating the displacement of said pump in response to said torque signal,
   speed ratio sensing means comprising a first speed sensor responsive to the RPM of said first wheel to provide a first speed signal, a second speed sensor responsive to the RPM of said second wheel to provide a second speed signal, comparator means for comparing said first and second speed signals to generate a speed ratio signal proportional to the ratio of RPM's of said first and second wheels, and
   transducer means receiving said speed ratio signal and connected to said torque responsive means to modify said torque responsive means output in response to said speed ratio signal.

2. The torque control with overspeed regulation for the hydrostatic drive of the vehicle of claim 1 further characterized by maximum torque setting control means adapted to receive said speed ratio signal, said maximum torque setting control means limiting the maximum value of said speed ratio signal prior to reception of such signal by said transducer.

3. The torque control with overspeed regulation for the hydrostatic drive of the vehicle of claim 2 wherein the speed ratio signal generated by said comparator is a voltage signal, said maximum torque setting control means consists of a variable resistance voltage divider adapted to be adjusted by the vehicle operator to a selected percentage of said resistance, and said maximum torque setting control provide a voltage output to said transducer which is such selected percentage of said speed ratio voltage signal.

4. The torque control with overspeed regulation for the hydrostatic drive of the vehicle of claim 1 including sensitivity control means associated with said speed ratio sensing means for selectively controlling the speed ratio range over which said comparator provides a decreasing speed ratio signal.

5. The torque control with overspeed regulation for the hydrostatic drive of the vehicle of claim 4 wherein said sensitivity control means is a variable resistance in parallel with comparator in a manner which connects across said resistance said second speed signal with the output of said comparator.

6. The torque control with overspeed regulation for the hydrostatic drive of the vehicle of claim 1 further characterized by aggressive control means associated with said speed ratio sensing means for selectively controlling the speed ratio at which said comparator provides zero output.

7. The torque control with overspeed regulation for the hydrostatic drive of the vehicle of claim 6 wherein said aggressive control means is a variable resistance connecting said second speed sensor with said comparator in a manner which selects the proportion of the second speed signal which is received by said comparator.

8. The torque control with overspeed regulation for the hydrostatic drive of the vehicle of claim 1 wherein said torque responsive comprises a fluid valve for modulating the flow of control fluid to said variable displacement pump to control the displacement thereof, said torque sensing means comprising means sensing pressure in said transmission hydrostatic line to generate said torque signal, and said valve being responsive to said torque signal to control the flow of control fluid therethrough.

9. The torque control with overspeed regulation for the hydrostatic drive of the vehicle of claim 8 wherein said transducer means generates a pressure signal in response to said speed ratio signal and applies said pressure signal to said torque responsive valve to further modulate the flow of control fluid through said valve.

10. The torque control with overspeed regulation for the hydrostatic drive of the vehicle of claim 1 including low speed lockout means associated with said speed ratio sensing means and responsive to said first speed signal to prevent the generation of a speed ratio signal until said first speed sensor establishes that said first wheel has obtained a minimum reference value.

11. The torque control with overspeed regulation for the hydrostatic drive of the vehicle of claim 1 including throttle responsive switch means associated with a throttle for said vehicle prime mover and interposed between said speed ratio sensing means and said transducer means, said throttle responsive switch being open when said throttle is in an idle position to prevent said speed ratio signal from operating said transducer when said throttle sets said prime mover for idle operation.

12. A torque control with overspeed regulation for a vehicle auxiliary hydrostatic drive, said vehicle having a first pair of primary driven wheels and a second pair of auxiliary driven wheels driven independently of said first wheels, the drive train for said second pair of wheels including a vehicle prime mover and a hydrostatic transmission comprising a variable displacement pump driven by said prime mover, a motor drivingly connected to said second pair of wheels, and first and second hydrostatic lines interconnecting said pump and motor in a closed loop in a manner that said motor is hydrostatically driven by said pump, said torque control characterized by:

torque sensing means responsive to the pressure differential in first and second hydrostatic lines to generate a torque signal representative of the torque transmitted by said hydrostatic transmission, torque responsive means including valve means and responsive to said torque signal to modulate flow of control fluid through said valve, a hydrostatic servo mechanism operatively connected to said pump and responsive to the flow of control fluid through said valve to modulate the displacement of said pump, speed ratio control means comprising first and second speed sensing means responsive to the RPM of said first and second pairs of wheels to generate first and second speed signals, comparator means for comparing said first and second speed signals to generate a speed ratio signal proportional to the RPM ratio of said auxiliary driven second pair of wheels to said primary driven first pair of wheels, aggressive control means associated with said speed ratio control to selectively modify the speed ratio signal of the comparator in a manner that the vehicle operator can modulate the desired speed ratio between the auxiliary drive to said second pair of wheels and the primary drive to said first pair of wheels, adjustable maximum torque allowed control means adapted to receive said speed ratio signal and limit the maximum strength of the speed ratio signal, an electro-hydraulic transducer which converts said speed ratio signal as modified by said maximum torque allowed control into a pressure differential output signal, fluid communication means for conducting said pressure differential output signal from said electro-hydraulic output signal to said valve in a manner which permits said pressure differential signal to bias said valve to further modulate flow through said valve in addition to the modulation caused by the torque signal to provide a torque control with overspeed regulation for said hydrostatic transmission.

13. A method of controlling an auxiliary hydrostatic drive to a vehicle having primary driven wheels and auxiliary wheels driven by a hydrostatic transmission including a variable displacement pump, said vehicle having first and second speed signal sensors providing first and second speed signals proportional to the speed of said primary driven wheels and said auxiliary driven wheels, said hydrostatic transmission having pressure differential sensing means, said method compromising:

(a) sensing a pressure differential in said hydrostatic transmission to provide a torque signal proportional to the torque transmitted by said hydrostatic transmission, and applying said torque signal to means controlling the displacement of a variable displacement pump in said hydrostatic transmission, (b) comparing said first and second speed signals and generating a speed ratio signal proportional to the speed differential between said auxiliary driven wheels and said primary driven wheels wherein said speed ratio signal is maximum when the auxiliary-to-primary speed ratio is less than 1 and the speed ratio signal decreases to zero at a selected auxiliary-to-primary speed ratio greater than 1, (c) converting said speed ratio signal into a hydrostatic signal, and modulating the displacement of said variable displacement pump with said hydrostatic signal in addition to said displacement previously selected by said torque sensing signal.

14. The method of claim 13 further including modifying said speed ratio signal in a manner which limits the maximum speed ratio signal permitted.

15. The method of claim 13 including selectively modifying the speed ratio signal so as to determine the speed ratio where the speed ratio signal reaches zero.

16. The method of claim 13 including varying the speed ratio signal in a manner which changes the range over which said speed ratio signal decreases from maximum to zero.

* * * * *